United States Patent [19]

Miyatsuka

[11] E Re. 28,626

[45] Reissued Nov. 25, 1975

[54] ELECTROPHOTOGRAHIC PHOTOSENSITIVE ZINC OXIDE POWDER MIXTURE

[75] Inventor: Hajime Miyatsuka, Asaki, Japan

[73] Assignee: Fuji Photo Film Co., Ltd., Minami-ashigara, Japan

[22] Filed: Jan. 13, 1975

[21] Appl. No.: 540,687

Related U.S. Patent Documents

Reissue of:

[64] Patent No.: 3,723,115
Issued: Mar. 27, 1973
Appl. No.: 106,721
Filed: Jan. 15, 1971

[30] Foreign Application Priority Data

Jan. 16, 1970 Japan ..... 45-4330

[52] U.S. Cl. ..... 96/1.8; 252/501
[51] Int. Cl.² ..... G03G 5/087
[58] Field of Search ..... 96/1.8; 252/501

[56] References Cited

UNITED STATES PATENTS

| | | | |
|---|---|---|---|
| 3,121,007 | 2/1964 | Middleton et al. | 96/1.8 X |
| 3,151,982 | 10/1964 | Corrsin | 96/1 R |
| 3,198,632 | 8/1965 | Kimble et al. | 96/1.8 X |
| 3,467,497 | 9/1969 | Weisbach et al. | 96/1.8 X |

*Primary Examiner*—Norman G. Torchin
*Assistant Examiner*—John R. Miller
*Attorney, Agent, or Firm*—Gerald J. Ferguson, Jr.; Joseph J. Baker

[57] ABSTRACT

An electrophotographic member comprising a support layer and an electrophotographic photosensitive layer disposed on the support layer, the electrophotographic photosensitive layer comprising a power mixture dispersed in an electrically insulative film forming binder material, the powder mixture being a mixture of larger zinc oxide particles and smaller zinc oxide particles, the ratio by weight of the larger particles to the smaller particles being within the range from 4 : 6 to 1 : 9, the larger particles having an average particle diameter of not less than 1.2 microns and the smaller particles having an average particle diameter of not more than 0.8 microns, at least 60 percent by weight of the larger particles having a diameter not less than 1 micron and at least 70 percent by weight of the smaller particles having a diameter not more than 1 micron whereby the particle size distribution curve is characterized by the presence of two peaks respectively corresponding to the smaller and larger particles.

4 Claims, 2 Drawing Figures

INVENTOR

HAJIME MIYATSUKA

BY FERGUSON & BAKER

ELECTROPHOTOGRAHIC PHOTOSENSITIVE ZINC OXIDE POWDER MIXTURE

Matter enclosed in heavy brackets [ ] appears in the original patent but forms no part of this reissue specification; matter printed in italics indicates the additions made by reissue.

DETAILED DESCRIPTION OF INVENTION

Figure 1:
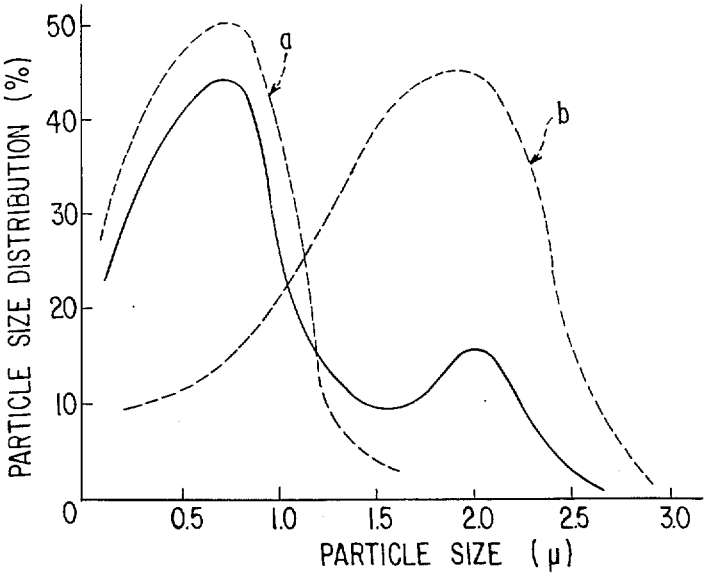
FIGS. 1 and 2 are graphs showing the particle size distribution of photoconductive zinc oxide powder employed in the electrophotographic photosensitive material according to this invention.

This invention relates to an electrophotographic photosensitive material and particularly to photoconductive zinc oxide employed as a component in a composition forming electrophotographic photosensitive layer.

In the ordinary electrophotographic process consisting of electrostatic charging, imagewise exposure and toner development, the tone-reproduction characteristics are considerably deteriorated by the well-known so-called edge effects, a phenomenon in which the electrostatic image having a wide solid area is developed with the image density being higher in the peripheral portion thereof than in the central portion thereof, resulting in the reproduced image having exaggeratedly intensified contours.

The edge effect is most usually prevented by the use of a development electrode. Though the use of a development electrode is quite effective for removing said edge effects, the effectiveness of said electrode is considerably dependent upon the distance between the photosensitive layer and said electrode. It is desirable to maintain said distance as small as possible, but realization of such a small distance as to be capable of giving satisfactory preventive effect involves considerable technical difficulties. Moreover, the dependence on the distance between the photosensitive layer and the development electrode becomes more marked when said photosensitive layer is provided with a smooth surface and in this case, therefore, it becomes necessary to maintain quite precisely said distance between the photosensitive layer and development electrode at an extremely small value in order to obtain a reproduced image of high quality without edge effects. It will be readily understood that this will be technically difficult.

Photoconductive zinc oxide powder employed in electrophotography generally shows, when prepared into a photosensitive layer, higher light sensitivity as the diameter of particles in-creases. Zinc oxide of excessive large diameter will, however, lead to porous dispersion thereof on the photosensitive layer, giving a rise to an extremely coarse surface in which the surface of support material is exposed locally. Such a surface is characterized by an elevated leaking speed of electrostatic charge disposed thereon, leading to an unsatisfactorily low density image. At the same time exact reproduction of the original pattern becomes impossible because of the elevated coarseness of the surface, and the reproduction of halftone or continuous tone images becomes extremely difficult even if the edge effects can be successfully prevented. From these reasons the practical particle diameter of photoconductive zinc oxide employed in electrophotography is limited to a certain value, though the light sensitivity is higher as the diameter increases. Said limit is also dependent on the thickness of the electrophotographic photosensitive layer, and usually does not exceed ca. 1.0 micron for a layer thickness of ca. 10 microns employed in ordinary electrofax paper.

In electrophotography toner streaking and fogging are the major factors which deteriorate the quality of the developed image. The phenomena of such toner streaking and fogging though naturally dependent on the properties of developer itself, are greatly influenced by the characteristics of photosensitive layer. For example, fogging due to retentive potential becomes a problem when the content of binder resin present in the photosensitive layer is large. Also the characteristics of the zinc oxide powder itself are sometimes related directly with the formation of retentive potential, and the composition of the photosensitive layer may also become the cause of said fogging or toner streaking. It is also empirically known that the phenomena of toner streaking and fogging are considerably influenced by, besides the composition of photosensitive layer itself, the shape of the surface of the photosensitive layer, and are apt to appear more frequently in the photosensitive layer provided with a smooth surface.

The object of this invention is to provide an electrophotographic photosensitive material capable of being developed with liquid developer and capable of effectively removing said edge effects without much dependence on the distance between the development electrode and said the photosensitive layer.

Another object of this invention is to provide an electrophotographic photosensitive material with high light sensitivity containing photoconductive zinc oxide powders of large particle size which cannot be employed alone due to poor dispersibility thereof in the photosensitive layer.

Further another object of this invention is to provide an electrophotographic photosensitive material relatively free from the phenomena of toner streaking and fogging.

The above-mentioned objects of this invention are achieved by providing an electrophotographic photosensitive layer essentially composed of finely divided, photoconductive zinc oxide powder and an insulative film forming material provided on a support material which comprises the use of a mixture of larger zinc oxide particle powders containing particles of a diameter not less than 1.0 micron at a content at least of 60 wt percent and having an average particle diameter not less than 1.2 microns and of smaller zinc oxide particle powders containing particles of diameter not exceeding 1.0 micron at a content at least of 70 wt percent and having an average particle diameter not more than 0.8 microns as said photoconductive zinc oxide powder. The mixing ratio of said larger particle zinc oxide powder and said smaller zinc oxide powder is within a range from 4 : 6 to 1 : 9. Thus the electrophotographic photosensitive material according to this invention can be prepared by applying onto a support material consisting of a paper sheet or resin film provided with an electroconductive layer thereon. According to the invention as described above, a solution is obtained by dispersing the mixture of photoconductive zinc oxide powder homogeneously with a resin component as the insulative film forming material by means of dispersing equipment.

In the case of electrophotographic photosensitive layer employing exclusively larger particle zinc oxide powder having average particle diameter of not less than 1.2 microns as said photoconductive zinc oxide powder, the dispersibility of zinc oxide in the photosensitive layer is quite unsatisfactory at a layer thickness of ca. 10 microns. On the other hand the disperson of zinc oxide in the photosensitive layer can be improved by mixing larger particle zinc oxide powder with smaller particle zinc oxide powder according to this invention so as to fill the cavities between the larger particles with smaller particles thereby to form a photosensitive layer of a continuous phase.

In order to obtain such an improved dispersion state the particles sizes of larger particle zinc oxide powder and smaller particle zinc oxide powder are subject to certain limitation, and such improved dispersion can be obtained effectively by choosing zinc oxide powder having particle sizes located within said limitations. According to the experiments carried out by the present inventors, it is confirmed that the average particle diameter of larger particle zinc oxide powder and of smaller particle zinc oxide powder should be not less than 1.2 microns and not more than 0.8 microns respectively, when measured by permeability method.

The advantages of this invention lie in the facts that larger particle zinc oxide having average particle diameter not less than 1.2 microns, which cannot be employed alone as photoconductive zinc oxide for electrophotography due to the drawbacks mentioned above, is made utilizable for this purpose by means of mixing with smaller particle zinc oxide powder thereby not only utilizing the elevated specific sensitivity thereof but also obtaining other advantages as described in the following.

The photosensitive layer of this invention is characterized by the surface shape thereof. Namely, in comparison with the surface of ordinary photosensitive layer containing sufficiently dispersed zinc oxide therein, the surface of the photosensitive layer obtained according to this invention is provided with considerably higher coarseness to give matted appearance. Furthermore a close examination for example by means of optical microscope with readily reveal the singularity of the surface shape of the photosensitive layer according to this invention. In the surface of the photosensitive layer of ordinary electrofax paper, the minimum unit of coarseness thereon is so small as to be almost unmeasurable by optical microscope, thereby giving a very smooth surface with minimum coarseness. On the contrary in the photosensitive layer obtained according to this invention, the surface coarseness shows measurably a large minimum unit and is essentially determined by spherical blocks of several tens of microns in diameter which are presumed to be composed of agglomerated zinc oxide particles. Furthermore in said photosensitive layer said spherical agglomerated blocks are distributed uniformly and continuously to show the surface of unique appearance that is completely different from that of ordinary electrofax paper.

The photosensitive layer of this invention has an appearance of homogeneous continuous phase under observation with bare eyes and the developed image is not deteriorated by the coarse surface despite the relatively large unit of coarseness thereof, because said agglomerated blocks constitute the minimum of coarseness and presumably are composed essentially of zinc oxide and are uniformly distributed on the photosensitive layer to form a surface which may be referred to as "uniform coarse surface." Matted appearance is also another unique point of the photosensitive layer provided with a "uniform coarse surface" according to this invention.

"The uniform coarse surface" of the photosensitive layer according to this invention results in various advantages as follows.

In the first place the photosensitive layer of this invention can have higher whiteness by the light scattering effect due to the larger coarseness of the surface thereof. Besides the photosensitive layer of this invention is capable of effectively preventing the aforementioned edge effect irrespective of the distance between the development electrode and the photosensitive layer.

Furthermore, the photosensitive layer of this invention is provided with an advantage of reduced toner streaking and lower fogging level compared with ordinary "smooth" photosensitive layer. Therefore, the photosensitive layer of this invention can be used with several kinds of liquid developers.

Moreover, the photosensitive layer of this invention is provided with another important advantage, compared with the other photosensitive layer with a "smooth" surface such as in ordinary electrofax paper, that is, the toner image formed thereon is barely affected by the friction with another plane. This is attributable to the fact that the "uniform coarse surface" has much fewer contact points with the other plane compared with a so-called "smooth surface." The toner image on the photosensitive layer shows considerably low mechanical strength particularly in a liquid developer due to swelling, etc., and easily forms scratches by the contact with developing electrode, etc., thus also rendering it impossible to shorten the distance to the developing electrode beyond a certain limit. In the photosensitive layer of this invention, however, the toner image formed thereon is so strong as to enable developing even under direct contact with developing electrode. Consequently the tone-reproduction of the photosensitive layer in this invention can be remarkably improved by minimizing the distance between the photosensitive layer and development electrode, namely by contacting the developing electrode with the photosensitive layer, and this fact also constitutes another important advantage of the photosensitive layer according to this invention.

As already explained above, the various advantages of the photosensitive layer of this invention are derived from the fact that said photosensitive layer is provided with "uniform coarse surface." The photosensitive layer provided with a "uniform coarse surface" can be most effectively be achieved by the process of this invention, and can never be prepared by single zinc oxide powder. For example, in case of employing a zinc oxide having a small average particle diameter and provided with a surface sufficiently wettable by organic solvents, a well dispersing coating solution only gives a photosensitive layer provided with an extrememly smooth and uniform surface, whereas the coating solution prepared by extremely little dispersion provides a smooth surface with layer blocks scattered thereon which are characterized by relatively large agglomerates (diameter ca. 100 microns) and which gives rise to the formation of visually distinguishable spots upon development. Such a surface which does not allow visually uniform development is referred hereinafter to "uneven coarse surface." In the case of such an "uneven coarse surface," the coarse portions are unevenly distributed in the homogeneous phase of the smooth surface of the photosensitive layer and are provided with electric properties such as charge retentive ability, etc., greatly different from those of the surrounding smooth surface to form white spots, etc., in the developed image thereby deteriorating remarkably the quality of said image.

The photoconductive zinc oxide powder employed in this invention consists of a mixture of two powders of larger particle size and smaller particle size, respectively, and thus the particle size distribution curve photoconductive zinc oxide powder to be employed in this invention is characterized by two peaks located at the larger and smaller particle size respectively and having heights corresponding to the mixing ratio thereof. Such unique size distribution pattern cannot be obtained in a single zinc oxide powder. For example, zinc oxide powder produced by the phase oxidation method and utilized commonly in the electrophotographic process usually has a particle size distribution curve provided with single peak.

The presence of two peaks in the particle size distribution curve seems to render the zinc oxide powder to be employed in this invention particularly suitable for obtaining a "uniform coarse surface." For example, in the process of this invention, when the amount of either zinc oxide powder, either larger sized one or smaller sized one, is decreased thereby lowering the corresponding peak in the distribution pattern to reach a powder substantially consisting of zinc oxide powder of a single species, the photosensitive layer obtained shows either "uneven coarse surface" or "smooth surface" and becomes not different from that obtained from zinc oxide powder of single species. From such a point of view the mixing ratio of larger particle and smaller particle zinc oxide powder is considered important in order to obtain the photosensitive layer provided with "uniform coarse surface" which is the principal characteristic of said layer according to this invention, and the optimum mixing ratio by weight of said larger sized powder and smaller sized one is found to be located within a range of 4 : 6 to 1 : 9, according to the experiments of the present inventors.

In the mixture of photoconductive zinc oxide powder employed in this invention, the zinc oxide powder of larger diameter is preferred to have an average particle diameter not less than 1.2 microns whereas that of smaller diameter is preferred to have an average particle diameter not more than 0.8 microns. Furthermore, in order to obtain a photosensitive layer provided with "uniform coarse surface" by a mixture of powder of larger particles and smaller particles, it is found to be necessary that said powder of larger particles contains particles with diameter not less than 1 micron at a content not less than 60 wt percent of said powder and that said powder of smaller particles contains particles with diameter not more than 1 micron at a content not less than 70 wt percent of said powder. This fact was confirmed as the results of experiments using various mixtures of zinc oxide powder.

In fact the photoconductive zinc oxide powder employed in electrophotography is almost exclusively produced by gas phase oxidation process and therefore has considerably narrow particle size distribution range represented by sharp size distribution curve. Consequently the condition mentioned above is almost invariably satisfied if the average particle diameter is well defined.

Conclusively the aforementioned advantages of the photosensitive layer according to this invention are derived from a "uniform coarse surface," which can be effectively realized by the fact that the zinc oxide powder employed consists of a mixture of two species of powders provided with larger particle size and smaller particle size respectively, having two peaks in the size distribution corve. Inversely stated, a simple and effective method for producing a "uniform coarse surface" is provided by this invention.

The morphological characteristics of the photosensitive layer provided with "uniform coarse surface" according to this invention are further clarified by the observation by optical microscope.

Namely in this case, the surface consists of agglomerates having diameter of 10 to 50 microns and presumed to be essentially composed of aggregated zinc oxide powder, with the spacing less than 100 microns between said agglomerates.

The surface of such condition is defined as the "uniform coarse surface" which is effective for realizing the objects of this invention and also realizing various advantages of the photosensitive layer according to this invention.

This invention is further provided with an advantage in that the manufacture of a photosensitive layer can be carried out under ordinary conditions without any limitation over the selection of binder resin, dispersing method etc.

It is to be noted, however, that the composition of the photosensitive layer should be sufficiently homogeneous over the whole surface thereof. For example an excessively mild dispersing condition leads to the formation of giant particles (ca. 100 microns) scattered in the regular background consisting of agglomerates of diameter 30–50 microns, and such formation should be prevented because said giant particles give rise to the formation of visually perceivable spots.

Thus it is important that the frequency of protruding portions with particle diameter exceeding 100 microns should not exceed $5/m^2$, preferably 1 or $2/m^2$, when examined over a wide surface under an optical microscope.

Also it is confirmed, by our experience, that the zinc oxide photosensitive layer is provided with an ideal surface structure such as mentioned above by the process of this invention more easily than by various other methods.

The result of the process of this invention is further assured by filtering the coating solution before application to the support material with filter cloth or metal filter of more than 200 mesh thereby removing large blocks contained therein. Said filtration prevents eventual contamination of photosensitive layer with large block of ca. 100 microns and assures the formation of a photosensitive layer provided with a "uniform coarse surface."

In order to obtain a photosensitive layer capable of being developed with a liquid developer and of providing the reproduction of continuous tone images, it is important to choose a binder resin capable of retaining electrostatic charge for a prolonged period in various liquid developers.

Preferred binder is determined in consideration of the charge retentive ability thereof in various insulative iquids, but most thermoplastic resins can be satisfactorily utilized for this purpose when the carrier liquid consists of isoparaffinic hydro-carbon with relatively low dissolving power. As an example of such thermoplastic resins are polyacrylic esters, polymethacrylic esters, copolymers of accrylic esters with styrene, vinyl acetate or methacrylic esters, or vinyl chloride-vinyl acetate polymer. On the other hand when the carrier liquid is provided with higher dissolving power such as cyclohexane, kerosene, decaline or aliphatic hydrocarbon containing a small amount of aromatic hydrocarbon etc., resins abundantly containing copolymer components having an elevated affinity to non-polar solvents such as styrene or butyl methacryelate show insufficient charge retentive ability, and therefore preferred are the resins with crossliked structure such as alkyd resin, epoxyester resins, epoxy resin, polyurethane resins, particularly alkyd resins or epoxyester resins cross-linked with polyisocyanate.

The mixing ratio by weight of photoconductive material and binder is preferred to be within a range of 1:1 to 20:1, and most practically employed is a ratio between 3:1 and 10:1.

The present invention will be further clarified by the following examples.

In the following examples prepared under identical conditions were photosensitive layers employing single species of zinc oxide of either larger particle size or smaller particle size exclusively.

The photosensitive layer prepared with zinc oxide powder of smaller particle size (exclusively employing zinc oxide having average particle size of 0.62 microns as photoconductive powdered material) is referred to as photosensitive layer A.

The photosensitive layer prepared with zinc oxide powder of larger particle size (exclusively employing zinc oxide having average particle size of 1.98 microns as photoconductive powdered material) is referred to as photosensitive layer B.

Furthermore the photosensitive layer prepared with a mixture consisting of 700 parts by weight of said smaller particle zinc oxide powder and 300 parts by weight of said larger particle zinc oxide powder (employing the mixture of zinc oxide powders having average particle sizes of 0.62 and 1.98 microns respectively as photoconductive powdered material) is referred to as photosensitive layer C.

On the thus prepared photosensitive layers A, B and C compared were the charging properties including the initial potential ($V_o$), dark decay potential retentive rate ($V_{60}/V_0$), and developing properties including toner streaking and fogging density, of which results are shown in Table 1.

At the measurements of various properties each photosensitive layer was conditioned in a dark place for more than 2 full days prior to the measurements.

EXAMPLE 1

1,000 parts by weight of photoconductive zinc oxide mixed powder consisting of 700 parts by weight of smaller particle zinc oxide powder (average particle diameter 0.62 microns) and 300 parts by weight of larger particle zinc oxide powder (average particle diameter 1.98 microns) is added with 240 parts by weight of styrenized alkyd resin varnish (Japan Reichhold; Styresol 4400), 110 parts by weight of polyisocyanate varnish (bayer AG; Desmodul L) and butyl acetate and dispersed sufficiently for ca. 30 minutes in a homogenizer. The coating solution thus prepared was then applied on a polyethylene terephthalate film provided with evaporated aluminum layer thereon (Toray Co.; Metalmy) so as to obtain a coating of 5 microns thick after drying. Drying was carried out at 50° C for more than 16 hours so as to realize hardening simultaneously with drying.

The photosensitive layer thus prepared is provided with the surface of matted apprarance, on which semi-spherical agglomerated blocks of diameter of 30 – 50 microns are distributed continuously and uniformly to form uniform coarse surface. The zinc oxide mixed powder employed in this example has a peculiar particle size distribution of FIG. 1 showing two maximum peaks at larger and smaller particle side respectively. The particle size distribution of each powder is also shown in FIG. 1 by dotted lines a and b respectively for smaller size and larger size zinc oxide powder.

The measurement of charging characteristics was carried out as follows. The sample was charged negatively with negative corona discharge, then subjected to the measurement of initial potential $V_0$ in air, successively immersed in kerosene and again subjected to the measurement of retentive potential $V_{60}$ 60 seconds after the measurement of $V_0$. The dark decay potential retentive rate is defined by $V_{60}$ devided by $V_0$.

The developer employed consisted of 4 g commercially available offset ink (Toyo Ink Manufacturing Co., Ltd.; blue ink) dispersed in 1 l. of kerosene, and the developing characteristics were evaluated on the developed line image with respect to the toner streaking and fogging density after developing for ca. 2 minutes in a stainless steel tray.

The photosensitive layer B is provided with extremely coarse surface with many cavities and lost the electrostatic potential thereof almost completely in the liquid developer thereby giving very low developing density and rendering the observation of toner streaking and fogging density meaningless.

This comparison in Table 1 shows that the photosensitive layer C is superior with respect to the other streaking and fogging density.

EXAMPLE 2

1,000 parts by weight of photoconductive mixed powder material consisting of 650 parts by weight of smaller size zinc oxide (average particle diameter 0.4 microns) and 350 parts by weight of larger size zinc oxide (average particle diameter 1.98 microns) is added with 240 parts by weight of styrenized alkyd resin varnish (Japan Reichhold Co.; Styresol 4,400), 110 parts by weight of polyisocyanate varnish (Bayer AG, Desmodul L) and a solution containing 0.2 parts by weight of Brilliant Blue FCF,

TABLE 1

| Photosensitive layer | ZnO powder | Initial potential ($V_o$) | Dark decay potential retentive rate ($V_{60}/V_o$) | Toner streaking | Fogging density | Photosensitive surface |
|---|---|---|---|---|---|---|
| Layer A | Small particle (average 0.62$\mu$) | −180 | 0.90 | Considerable | High | Smooth |
| Layer B | Large particle (average 1.98$\mu$) | −130 | 0.23 | | | Extremely coarse |
| Layer C | Mixture of large particle and small particle | −150 | 0.85 | Scarce | Extremely low | Uniformly coarse |

0.4 parts by weight of eosin and 0.5 parts by weight of fluorescein as sensitizing dyes dissolved in 40 parts by weight of methanol.

Figure 2:
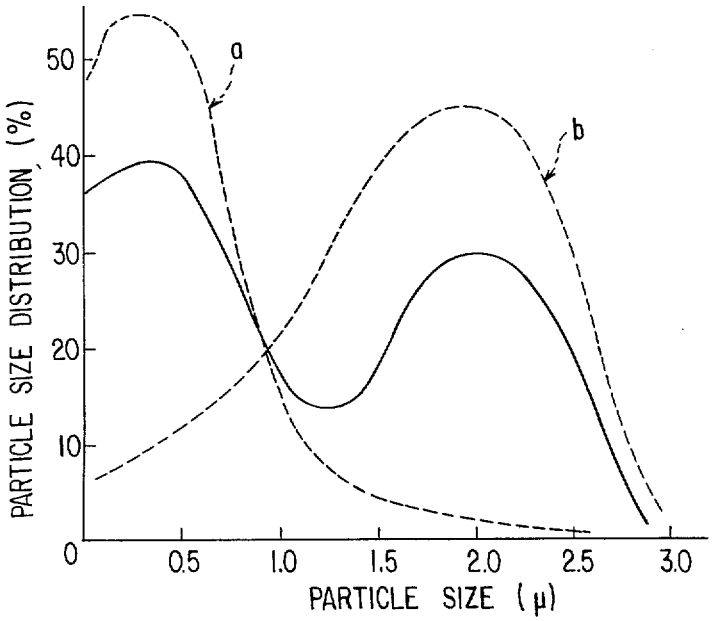

The mixture is further added with butyl acetate and sufficiently dispersed for ca. 30 minutes in a homogenizer. The coating solution thus prepared was applied on Metalmy similarly as in Example 1, then dried and hardened to obtain electrophotographic photosensitive layer. The photosensitive layer thus prepared is provided with "uniform coarse surface" and has sensitivity in the visible wavelength range. The particle size distribution of the mixed zinc oxide powder is represented by the full line in FIG. 2, which also shows the size distribution of smaller and larger size zinc oxide powder by the dotted lines a and b, respectively.

What is claimed is:

1. An electrophotographic member comprising a support layer and an electrophotographic photosensitive layer disposed on said support layer, said electrophotographic photosensitive layer comprising a powder mixture dispersed in an electrically insulative film forming binder material, said powder mixture being a mixture of larger zinc oxide particles and smaller zinc oxide particles, the ratio by weight of said larger particles to said smaller particles being within the range from 4 : 6 to 1 : 9, said larger particles having an average particle diameter of *not less than* 1.2 microns and said smaller particles having an average particle diameter of *not more than* 0.8 microns, at least 60 percent by weight of said larger particles having a diameter not less than 1 micron and at least 70 percent by weight of said smaller particles having a diameter not more than 1 micron whereby the particle size distribution curve is characterized by the presence of two peaks respectively corresponding to said smaller and larger particles.

2. An electrophotographic photoconductive layer as claimed in claim 1, wherein said photoconductive zinc oxide is formed by gas phase oxidation process.

3. An electrophotographic photoconductive layer as claimed in claim 1, wherein said insulating film forming material is alkyd resin cured by polyisocyanate.

4. An electrophotographic photoconductive layer as claimed in claim 1, wherein said insulating film forming material is epoxyester resin cured by polyisocyanate.

* * * * *